US009037715B2

(12) United States Patent
Lenz et al.

(10) Patent No.: US 9,037,715 B2
(45) Date of Patent: May 19, 2015

(54) METHOD FOR SEMANTIC RESOURCE SELECTION

(75) Inventors: Norbert Lenz, Boeblingen (DE);
Markus Mueller, Boeblingen (DE);
Martin Reitz, Boeblingen (DE);
Joachim Weber, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 525 days.

(21) Appl. No.: 12/481,489

(22) Filed: Jun. 9, 2009

(65) Prior Publication Data
US 2009/0307355 A1 Dec. 10, 2009

(30) Foreign Application Priority Data
Jun. 10, 2008 (EP) ..................... 08157961

(51) Int. Cl.
*G06F 15/173* (2006.01)
*G06F 9/50* (2006.01)

(52) U.S. Cl.
CPC ................... *G06F 9/5061* (2013.01)

(58) Field of Classification Search
CPC ................ H04L 47/782; G06F 2209/503
USPC ................ 709/226, 222, 223; 713/100
See application file for complete search history.

(56) References Cited

U.S. PATENT DOCUMENTS

| 4,627,018 A | 12/1986 | Trost et al. |
| 5,838,317 A | 11/1998 | Bolnick et al. |
| 6,038,677 A * | 3/2000 | Lawlor et al. .................. 714/4.1 |
| 7,065,620 B2 | 6/2006 | Ballard et al. |
| 7,100,082 B2 | 8/2006 | Little et al. |
| 7,100,083 B2 | 8/2006 | Little et al. |
| 7,321,992 B1 | 1/2008 | Vellore et al. |
| 7,412,479 B2 | 8/2008 | Arendt et al. |
| 7,610,297 B2 | 10/2009 | Kamppari |
| 2003/0079154 A1 | 4/2003 | Park et al. |
| 2005/0091352 A1 * | 4/2005 | Alex et al. ..................... 709/223 |
| 2007/0156665 A1 | 7/2007 | Wnek |
| 2007/0250608 A1 * | 10/2007 | Watt ............................. 709/222 |

(Continued)

OTHER PUBLICATIONS

Engelmann et al., Concepts for High Availability in Scientific High-End Computing, Laboratory Directed Research and Development Program—Oak Ridge National Lab (7 pgs).

(Continued)

*Primary Examiner* — Glenford Madamba
(74) *Attorney, Agent, or Firm* — Toler Law Group, P.C.

(57) ABSTRACT

A method of selecting active members of resource groups is disclosed. The method includes assigning a first label from a predetermined static label set to a first member of a first resource group. The method includes assigning a second label from the predetermined static label set to a second member of the first resource group. The method further includes assigning the first label to a third member of a second resource group. The method includes assigning the second label to a fourth member of the second resource group. The method also includes selecting an active label from the predetermined static label set in response to a command received at a computing system. Upon selection of the active label from the predetermined static label set, computing resources identified by members associated with the active label are automatically placed online and computing resources identified by members associated with a label other than the active label are automatically placed offline.

20 Claims, 6 Drawing Sheets

(56) References Cited

U.S. PATENT DOCUMENTS

2008/0126793 A1* 5/2008 Jostmeyer et al. ............ 713/100
2009/0037367 A1* 2/2009 Wein ................................. 707/2
2009/0164502 A1 6/2009 Dasgupta et al.
2009/0276657 A1 11/2009 Wetmore et al.
2009/0328205 A1 12/2009 Ims et al.

OTHER PUBLICATIONS

Engelmann et al., Symmetric Active/Active High Availability for High-Performance Computing System Services, Journal of Computers, vol. 1, No. 8, Dec. 2006 (12 pgs).

U.S. Appl. No. 11/531,046, Non-Final Office Action dated Jun. 11, 2010, (6 pgs).

* cited by examiner

|  | Set online | Set offline | Set preferred Member |
|---|---|---|---|
| Role Operator | ✓ | ✓ | ✗ |
| Role Automation Manager | ✓ | ✓ | ✗ |
| Role Disaster Recovery Manager | ✗ | ✗ | ✓ |

METHOD FOR SEMANTIC RESOURCE SELECTION

CROSS-REFERENCE TO RELATED APPLICATIONS

The application claims priority of European Patent Application No. 08157961.7, filed Jun. 10, 2008.

BACKGROUND

The present disclosure is generally related to a method of switching by a policy-based automation engine a preferred member of a set of members.

Within enterprise computing centers dedicated to supporting an Information Technology (IT) infrastructure, human operators may be employed to keep diverse applications up and running. In order to achieve high levels of availability, software programs—typically called 'automation software'—may be used to support the operators.

Automation software often handles scenarios in which an application and Information Technology (IT) resources need to be stopped, moved or restarted either in planned scenarios for maintenance purposes or in unplanned scenarios when failures occur. Automation software may be script-based or policy-based. Scripts may be written by a system application programmer or by a system administrator to implement the desired automation support. Automation products that are policy-based may use an abstract configuration description of the application and of the IT resources needed to run the application. When an event occurs that requires transfer of operation from one set of resources to another, each transferee resource to which the transfer occurs must be placed online and each transferor resource from which the transfer occurs may be placed offline.

BRIEF SUMMARY

In a particular embodiment, a method includes assigning a first label from a predetermined static label set to a first member of a first resource group. The first member identifies a first computing resource. The method also includes assigning a second label from the predetermined static label set to a second member of the first resource group. The second member identifies a second computing resource. The method further includes assigning the first label to a third member of a second resource group. The third member identifies a third computing resource. The method includes assigning the second label to a fourth member of the second resource group. The fourth member identifies a fourth computing resource. The method also includes selecting an active label from the predetermined static label set in response to a command received at a computing system. Upon selection of the active label from the predetermined static label set, computing resources identified by members associated with the active label are automatically placed online and computing resources identified by members associated with a label other than the active label are automatically placed offline.

In another particular embodiment, a system includes a memory and a processor. The memory stores information of configurations of resources in a computing network. The processor assigns a first label from a predetermined static label set to a first member of a first resource group. The first member identifies a first computing resource. The processor further assigns a second label from the predetermined static label set to a second member of the first resource group. The second member identifies a second computing resource. The processor further assigns the first label to a third member of a second resource group, the third member identifying a third computing resource. The processor assigns the second label to a fourth member of the second resource group, the fourth member identifying a fourth computing resource. The processor selects an active label from the predetermined static label set in response to a command received at a computing system. Upon selection of the active label from the predetermined static label set, computing resources identified by the members associated with the active label are automatically placed online and computing resources identified by members associated with a label other than the active label are automatically placed offline.

Another particular embodiment is a computer readable storage medium comprising instructions that, when executed by a processor, cause the processor to assign a first label from a predetermined static label set to a first member of a first resource group, the first member identifying a first computing resource. The computer readable storage medium further comprises instructions that, when executed by a processor, cause the processor to assign a second label from the predetermined static label set to a second member of the first resource group, the second member identifying a second computing resource. The computer readable storage medium further comprises instructions that, when executed by a processor, cause the processor to assign the first label to a third member of a second resource group, the third member identifying a third computing resource. The computer readable storage medium further comprises instructions that, when executed by a processor, cause the processor to assign the second label to a fourth member of the second resource group, the fourth member identifying a fourth computing resource. Further, computer readable storage medium further comprises instructions that, when executed by a processor, cause the processor to select an active label from the predetermined static label set in response to a command received at a computing system. Upon selection of the active label from the predetermined static label set, computing resources identified by the members associated with the active label are automatically placed online and computing resources identified by members associated with a label other than the active label are automatically placed offline.

DETAILED DESCRIPTION

Figure 1:
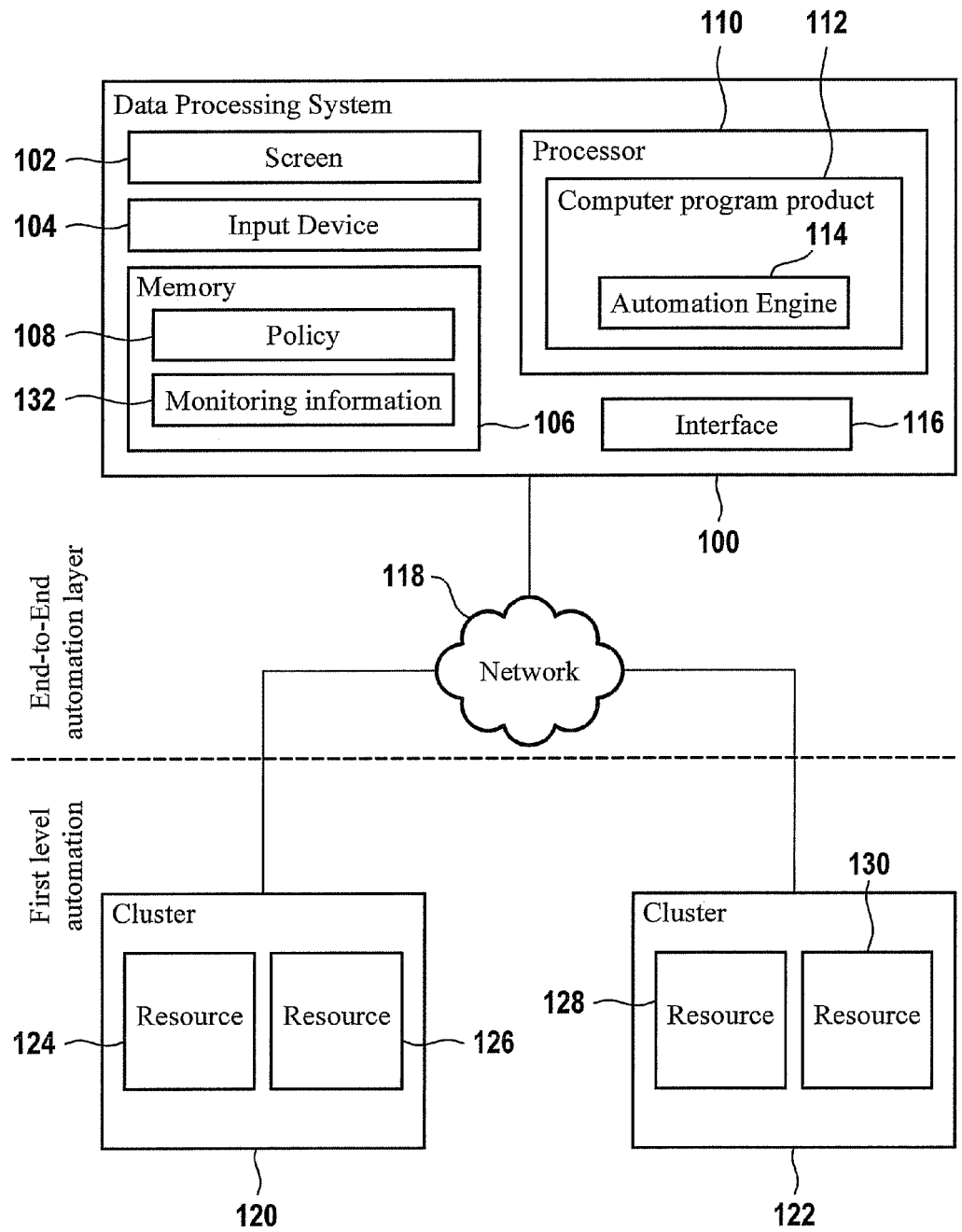
FIG. 1 is a block diagram of an illustrative embodiment of an automation system.

In a large computing network, computing resources may be organized into clusters. There may be dependencies between resources that are running in different clusters. End-to-end system automation is one way to address the problem of managing resources in different clusters. A first-level automation layer may include multiple isolated clusters for high-availability of resources within the cluster boundaries. An end-to-end automation layer may be placed on the top of a first-level automation layer. The end-to-end automation layer may automate cross-cluster dependencies between resources from different clusters. The end-to-end automation layer may use adapters to connect to multiple, heterogeneous first-level clusters.

An end-to-end automation manager typically manages the following types of resources: resource references, resource groups and choice groups. Resource references are virtual resources that reference actual resources. The actual resources may be hosted by first level automation clusters. Resource groups may include members that share the same automation goal and may be managed as one unit. Group members can be resource references, choice groups or other resource groups, thus allowing an arbitrary level of nested groups.

End-to-end automation choice groups may have the characteristics that the members of a choice group may be configuration alternatives that provide the same functionality. For example, two databases can be provided where one is used as a production database and the other one serves as a backup. In a choice group, only one of the members may be online at a time. The members can be resource references, resource groups, or choice groups. One member of the choice group may be defined as a 'preferred member.' When the desired state of the choice group is online, the automation manager may keep the preferred member online, while keeping the other members offline.

A "takeover group" is a concept applicable to end-to-end system automation and to first level system automation. A takeover group is an extension of a choice group that allows semantics-based selection of a preferred member and therefore enables additional functionality. For example, the additional functionality may include a 'co-indexed' relationship, explained below. A simple management interface to a higher-level management automation layer may be used for disaster recovery management.

End-to-end automation is goal driven. This means that the automation manager may know the automation goal for each resource it manages. Automation goals are typically called requests. There may be multiple competing and possibly conflicting requests for a single resource. Requests may have a priority and the request with the highest priority may determine the so-called 'desired state' of the resource. Possible desired state values for a resource may be, for example, 'online' or 'offline'. The end-to-end automation manager seeks to implement the highest priority request by trying to keep the resource in its desired state.

In event-driven system automation, the automation engine subscribes for events of the managed resources. The managed resources may inform the subscribers of any status change. Thus, a new automation cycle may be triggered either by events being received and/or requests being submitted or removed. Event-driven system automation has the advantage that a permanent re-evaluation is not required, thus saving valuable computational resources.

The automation manager is further aware of relationships between resources that are defined in the end-to-end automation policy. Relationships are constraints on automation behavior. Examples of relationships are 'StartAfter,' 'StopAfter' and 'ForcedDownBy.' The automation manager respects relationships as part of a policy, so relationships influence the automation behavior. For example, when a first resource has a StartAfter relationship to a second resource, the second resource is started before the first resource is started.

The automation manager may further pursue the desired state of resource references not by issuing start or stop commands, but rather by submitting requests for the referenced resources managed by the first level automation managers. This enables a resource to be started or stopped when the first level automation manager has determined that any relationships defined for the resource in the first level automation policy are fulfilled and no higher priority requests exist.

To ensure that each resource is kept in its desired state, the automation manager may keep track of various states for each resource. One possible state is the 'desired state.' The desired state may be an automation goal that the automation manager pursues. Possible desired states include online and offline. When the desired state is online, the automation manager tries to keep the resource online. When the desired state is offline, the automation manager tries to keep the resource offline. The 'observed state' describes the current state of the actual first level automation resource as reported by the first level automation manager. When the observed state is online, the resource is running. When the observed state is offline, the resource is stopped. Another state is a 'compound state.' The compound state indicates whether the resource or resource group works as desired or whether problems have occurred. For example, the resource can provide a traffic light indicator informing operators when they need to react to a situation. As explained below, a compound state may be set to OK, warning, error, and fatal. Another state is the 'operational state' which provides additional information about the compound state.

A policy-based automation engine may be used to switch a preferred member of a set of members included in a first takeover group that is an extension of an end-to-end choice group. The set of members in the first takeover group may describe resource configuration alternatives for associated resources. The resources may reside in multiple different clusters on identical or different system platforms. Interdependencies may exist between resources. A first takeover group may be defined by a predetermined automation policy. The set of members in the first takeover group include a first preferred member describing a first active resource configuration. The members may be associated with labels of predetermined sets of labels, the labels semantically denoting the members. A configuration command may specify one label of the set of labels and an operation statement. The operation statement indicates a switching of a preferred member. Switching to a new first preferred member of the set of members included in the first takeover group is performed by selecting the member associated with the label specified in the configuration command. The new first preferred member describes a new first active resource configuration.

FIG. 1 is a block diagram of an illustrative embodiment of an automation system that includes a data processing system 100 and two first-level automation clusters 120 and 122. The data processing system 100 may either be part of the cluster 120 or the cluster 122 or may be a standalone data processing system. The data processing system 100 may communicate with the clusters 120 and 122 by means of a network 118 (e.g., an intranet or the Internet). The communication may be performed by means of an interface 116. Communication by the interface 116 may require special adapters for the clusters 120 and 122. These adapters can be regarded as a part of the data processing system 100.

The data processing system 100 further includes a computer screen 102 and an input device 104 that may be a mouse and a keyboard. The data processing system 100 also includes a memory 106 which includes an automation policy 108. The automation policy 108 may be an abstract configuration description of an application and the IT resources needed to run the application. The memory further includes monitoring information 132 about the first-level automation resources 124, 126, 128, 130 that may be managed by the data processing system 100.

The data processing system 100 includes a processor 110 which may be adapted to execute computer executable instructions stored in a computer program product 112. The computer program product 112 includes the end-to-end automation engine 114.

The resource 124 may be a database and the resource 126 may be a computer system adapted to perform special operation tasks accessing the database 124. For example, the system architecture depicted in FIG. 1 may be part of a banking environment where the cluster 120 serves as the 'working cluster,' and the cluster 122 serves as 'backup cluster.' The cluster 122 includes a resource 128 and a resource 130, and the resource 128 and the resource 130 have interdependencies with the resources 124 and 126, respectively. In a particular embodiment, the resource 128 is a copy of the database resource 124. Similarly, the resources 126 and 130 may be backup applications.

When, for maintenance purposes, the cluster 120 needs to be shut down, the data processing system 100 may need to transfer workload from the first cluster 120 to the second cluster 122. The policy 108 may define how the workload is allocated among the resources 124, 126, 128 and 130 together with additional automation constraints such as relationships between the resources. Embodiments may eliminate the need for a script mechanism that would be required in order to transition from a configuration that accesses the cluster 120 to another configuration that accesses the cluster 122.

Figure 2:
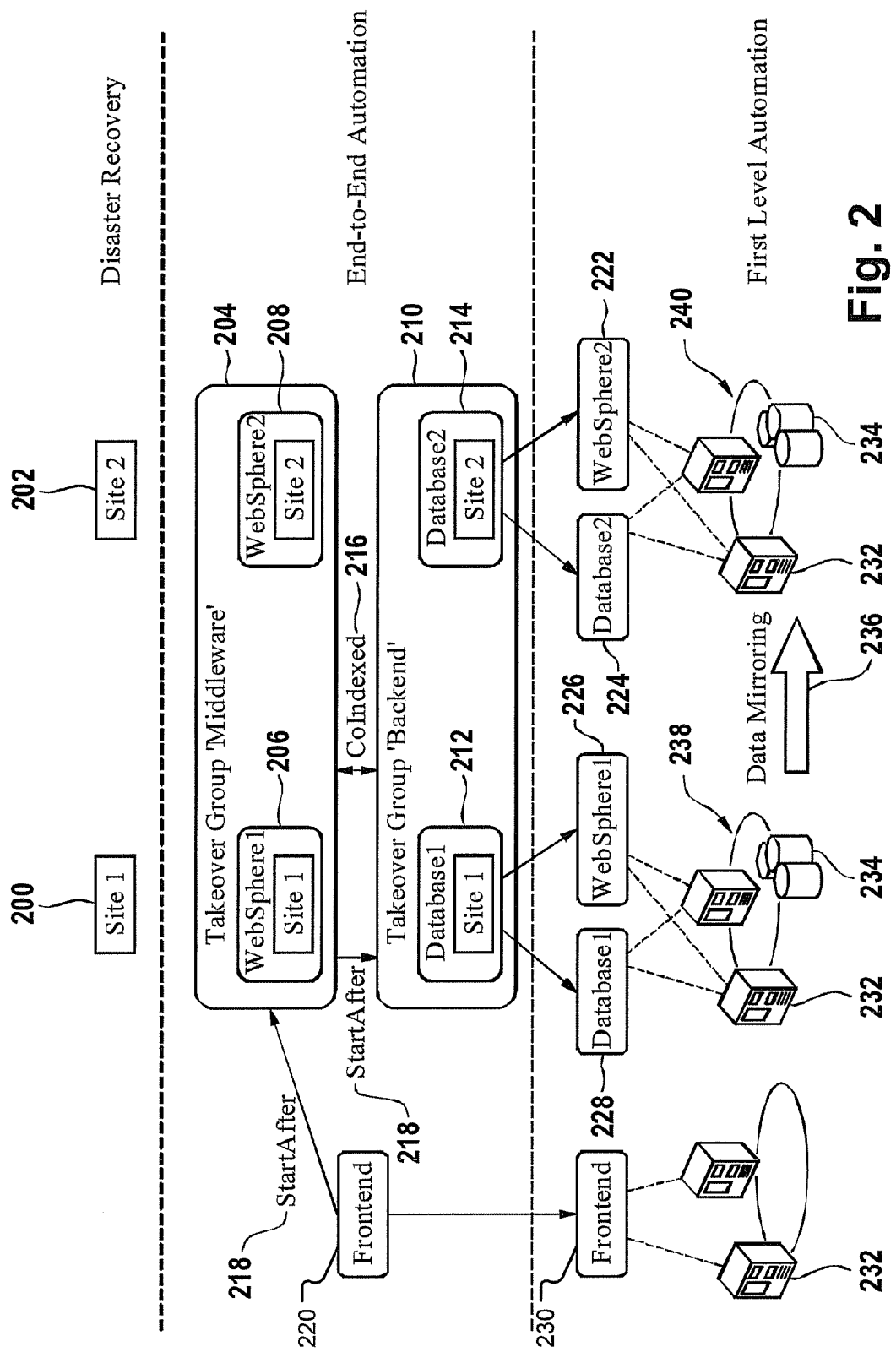
FIG. 2 is a block diagram of an illustrative embodiment of different automation layers of managed resources.

FIG. 2 is a block diagram of an illustrative embodiment of different automation layers of managed resources. The first level automation layer includes various resources, such as a front end 230, a first database 228, a first web sphere 226, a second database 224 and a second web sphere 222. A web sphere may be, for example, an application server designed to set up, operate and integrate e-business applications across multiple computing platforms using web technologies. The front end 230 may be operated in a separate cluster. The first database 228 and web sphere 222 may also be operated in a separate cluster 238. The second database 224 and second web sphere 222 are operated in cluster 240. The front end 230 may include a set of data processing systems 232. The first database 228 and the first web sphere 226 may be associated with further data processing systems 232, as well as data storage devices 234.

An end-to-end automation layer may be placed over the first level automation layer. In FIG. 2, an automation policy defines two groups, namely the takeover group 'Middleware' 204 and the takeover group 'Backend' 210. In general, 'Middleware' is computer software that connects software components or applications. By means of the automation policy, in the takeover group 204, two members 206 and 208 may be defined as describing alternative resource configurations. The resource reference 'WebSphere 1' 206 references the first level resource 'WebSphere1' 226, and the resource reference 'WebSphere2' 208 references the first level resource 'WebSphere2' 222. For example, the member 206 describes a resource configuration alternative in which the first web sphere 226 may be used and the member 208 defines a resource configuration alternative in which the second web sphere 222 may be used. Similarly, with respect to the takeover group 'Backend' 210, a member 212 describes a resource configuration associated with the first database 228 and the member 214 describes an alternative resource configuration associated with the second database 224. Generally, the groups 204 and 210 are called 'takeover groups'. Further included in the end-to-end automation layer is the resource 'Frontend' 220, which may be directly related to the first level resource 'Frontend' 230 by means of a resource reference.

The resource 220 may be associated with the takeover group 204 by means of a 'StartAfter' relationship 218 which indicates that in the end-to-end automation layer the resource 220 may be started only after the takeover group 204 has been started. The same holds true with respect to the relationship interconnecting the takeover group middleware 204 and the takeover group 'Backend' 210. The takeover group 'Backend' 210 is started first due to the rule 'StartAfter' 218. Thus, when the resource 'Frontend' 220 is requested 'online', first the takeover group 'Backend' 210 may be started, followed by the takeover group 'middleware' 204, followed by the resource 'Frontend' 220. Starting the end-to-end resource references in this way means that online requests may be submitted for the referenced resources that reside in the first level automation clusters.

Each member of the takeover groups may be associated with a label from a predefined label set. The member 206 and the member 212 may be each associated with the label 'Site 1,' whereas the members 208 and 214 may be associated with the label 'Site 2.' A disaster recovery layer may be above the end-to-end automation layer. In the disaster recovery layer, the labels used in the end-to-end automation layer may be defined. To illustrate the purpose of the disaster recovery layer, in the following it may be assumed that an automation system such as a banking environment is in an operating mode. The takeover group 204 will be online with its preferred member being, for example, the member 206. Also, the takeover group 210 is online with its preferred member being, for example, the member 212. Since these two members are active, the automation policy indicates that operation of the banking environment utilizes the first automation level by means of the first database 228 and the first web sphere 226, as well as the front end 230 to perform banking operations. During operation, preferably a continuous data mirroring 236 may be performed of the storage 234 being accessed by the first database 228 and a second database 224.

The disaster recovery layer with its disaster recovery manager may detect an outage that may be the beginning of a disaster, within the first automation level. Monitoring by the end-to-end automation level may detect, for example, an outage within the first automation level. Within the takeover groups 204 and 210, or within the resource 220, a certain event may be published containing information about the outage. For example, the desired state of the takeover group 'Middleware' 204 may be set online, but the observed state may differ from online. This condition, in combination with an erroneous operational state indicates that an error has occurred within the resource group 204. The error may be, for example, due to an error in the database 228 which causes resource reference 212 to enter an erroneous compound state and observed state offline. Because the resource reference is a member of the takeover group, the takeover group's observed state will differ from online. Since the observed state and the desired state do not correspond, the compound state of the takeover group 204 will go into a warning or error state.

A resource modified event may be published by the automation engine that informs the disaster recovery layer about the changes of the observed state and the compound state of the takeover group 204. This may trigger the disaster recovery manager to perform a site takeover, performing various steps in order to ensure a recovery of the banking environment at the backup site. In response, the disaster recovery manager may stop the data mirroring 236. Further, the disaster recovery manager may trigger a site takeover by setting the preferred members in the end-to-end automation layer to the member index (label) 202 'Site 2.' In other words, this corresponds to a decision to switch operations from the cluster including the first database 228 and first web sphere 226 to the cluster including the second database 224 and second web sphere 222.

A static label set may allow a simple, static interface that can be used by the disaster recovery manager to trigger a change of the preferred member at all associated takeover groups. In turn, the end-to-end automation layer with its end-to-end automation manager may determine all associated takeover groups by a broad search of a resource graph along a 'co-indexed' relationship. Then, the end-to-end automation manager may determine the resource names of the members associated with the member index 202 'Site 2.' In FIG. 2, these may be the members 208 and 214.

The takeover groups 204 and 210 may be co-indexed by the relationship 216. Co-indexing means, that in takeover groups which are co-indexed, a preferred member switching may be performed simultaneously when the site takeover is triggered by the disaster recovery manager. Thus, the preferred member switching may be performed in the group 204 and 210 simultaneously. After having switched the system to the cluster including the second database 224 and the second web sphere 222, the system is running, preferably without any loss of data, as before when the cluster including the first database 228 and the first web sphere 226 was used for operation.

Thus, the takeover groups 204 and 210 may be co-indexed in the end-to-end automation layer, and the end-to-end automation layer may be controlled by the policy-based automation engine. A higher level management layer accesses the end-to-end automation layer and may be controlled by a higher-level automation engine or operator. The set of labels may be predetermined by the higher level management layer as part of an interface which may be used by the higher level management layer to issue the command. Introducing the additional 'higher level management layer' has the advantage that a super ordinate instance may be provided which is able to manage the switching of preferred members for different takeover groups. Preferably, such switching in the higher level management layer may be performed automatically by the automation engine based on monitoring of resources, for example.

In operation, the labels of the label set may be assigned injectively to the members of a takeover group, where each label of the label set may be associated with exactly one member of the takeover group and a member of a takeover group can be associated with zero, one, or multiple labels.

When receiving a command, whether a first takeover group 204 is co-indexed with a second takeover group 210 is determined. Thus, it is determined whether a bidirectional 'co-indexed' relationship is established between the two takeover groups 204 and 210. The set of members in the second takeover group 210 includes a second preferred member describing a second active resource configuration. When the first takeover group 204 is co-indexed with the second takeover group 210 via a 'co-indexed' relationship, the second preferred member is switched to a new second preferred member. This is accomplished by selecting the member associated with the label specified in the configuration command. Thereby, the new second preferred member describes a new second active resource configuration that is semantically consistent with the preferred member of the first takeover group 204.

In accordance with an illustrative embodiment, the switching within the second takeover group 210 may be performed consistently and triggered simultaneously with the switching within the first takeover group 204. This ensures that at any given time, a set of co-indexed takeover groups has the same label for determining the preferred members. In other words, instead of providing scripts which individually switch the preferred member of every choice group one after the other, with the feature of co-indexed takeover groups it is possible to switch the preferred members of multiple takeover groups automatically by a single command, with lowered administrative effort. This can be done for any number of co-indexed groups. Script-based switching does not allow an instantaneous switching of preferred members with a large number of choice groups. In contrast to script-based switching, by co-indexing takeover groups in combination with the semantic indication of takeover group members, preferred member switching in multiple groups can be performed simultaneously and automatically, i.e. at a single point in time. Because the consistent switch of multiple takeover groups can be triggered by a single operation that may be executed by the automation engine 114, errors can be avoided that may result from inconsistent configurations caused by multiple operator commands.

Embodiments enable setting the preferred member of a takeover group by specifying a label rather than a member identifier. A co-indexed relationship between takeover groups may enable switching the preferred member of multiple takeover groups consistently in an atomic operation. The label set may enable a simple management interface between the end-to-end automation layer that automates management of the takeover groups.

Resource configurations can be selected in a semantic manner. Compared to state of the art automation systems, members describing resource configurations can be selected based on their purpose and meaning rather than a simple identifier such as a resource name. This becomes especially important in case of multiple takeover groups, each group including a set of members. By simply denoting the members of the takeover groups with the semantic labels of a common label set, resource configurations can be selected consistently and synchronously for all takeover groups by simply selecting one descriptive label of a label set common to all takeover groups.

Figure 3:
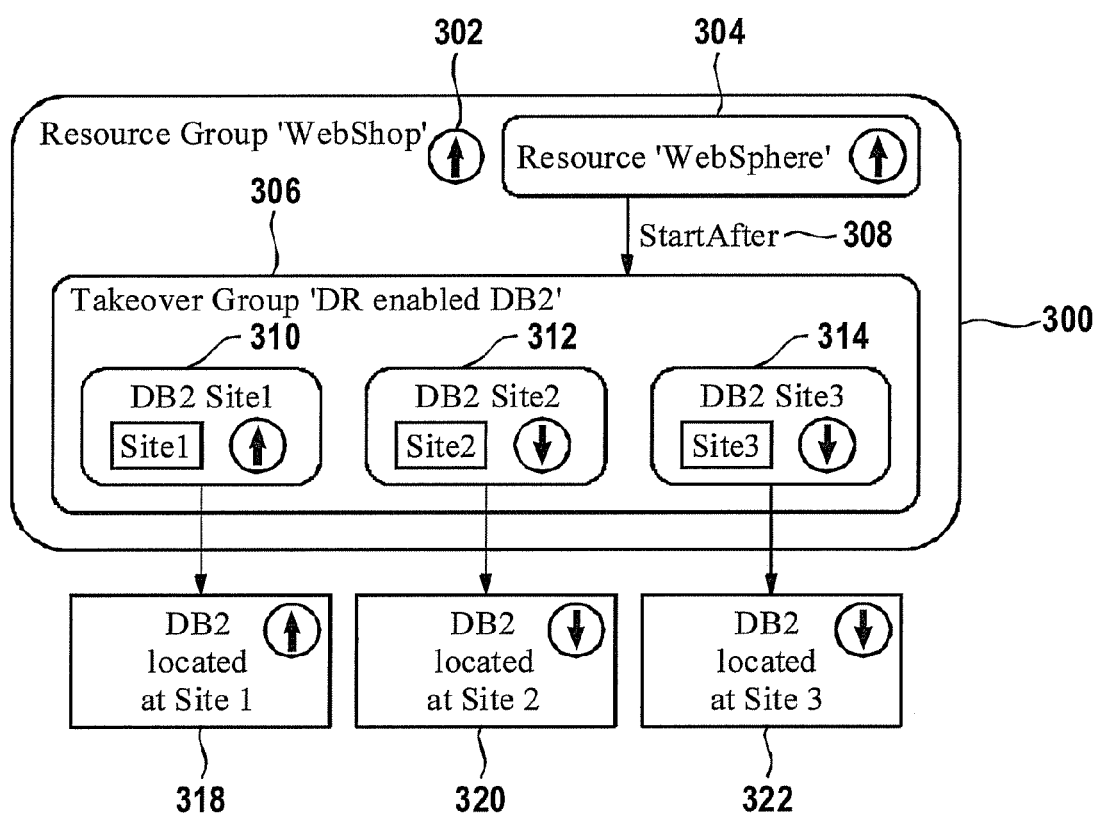
FIG. 3 is a block diagram of an illustrative embodiment of disaster recovery using a takeover group in a policy.

FIG. 3 is a block diagram of an illustrative embodiment of disaster recovery using a takeover group in a policy. FIG. 3 illustrates a takeover group 'DR enabled DB2' 306 that is a member of a resource group 'WebShop' 300. The resource group 300 further includes a resource 'WebSphere' 304. The takeover group 306 includes three resource references 310, 312 and 314 as members. Each member may be associated by means of a reference with a respective first level resource 318, 320 and 322. For example, the resource 318 may be a database application hosted by a cluster located at a first site, the resource 320 may be a database application hosted by a cluster located at a second site and the resource 322 may be a database application hosted by a cluster located at a third site. The resource group 300 further includes a 'StartAfter' relationship 308 defines a rule that the resource 304 may be started only after the takeover group 306 has been started.

In FIG. 3, the arrows inside the circles indicate a request of a resource. An up arrow indicates an online request and a down arrow indicates an offline request. In FIG. 3, the member 310 is the preferred member. Therefore, when the request 302 placed on the resource group 300 is an online request, the resource group 300 places an online request on both members, the resource 304 and the takeover group 306. Since the takeover group 306 is requested online, the preferred member 310 may be also requested online which results in the desired state online for resource reference 310. Thus, an online request may be passed down to the referenced resource 318 which may be the database application located in a first level automation cluster at site 1.

When a disaster recovery manager detects an outage (which may be the beginning of a disaster), at the database application 318 located at site 1, the disaster recovery manager may trigger a takeover by site 2 or site 3 by selecting a label different from the label 'Site 1.' For example, the disaster recovery manager may decide to set the label to 'Site 2' which may result in the end-to-end automation manager determining the resource names of the members which are associated with the label 'Site 2.' In FIG. 3, this corresponds to the member 312. After the disaster recovery manager has triggered the site takeover by setting the preferred member to the member index 'Site 2,' the preferred member may be switched to the member 312. Resource reference 312 becomes the preferred member while resource reference 310 becomes an alternative member. Thus, the online request may be removed from resource reference 310 and placed at resource reference 312 which will be set to the online state, whereas the member 310 will be set to the offline state. First level resource 318 may be stopped and first level resource 320 may be started, and the running application may be moved to site 2.

In operation, operation statements may be associated with access rights. Authorization to execute a command specifying the operation statement may depend upon such access rights. Role-based access control at a fine granularity of operations on specific resource types enables control of who can perform an operation on a specific resource. In this way, certain functionality can be limited to a specific role. In this context, a role may be a specific layer or a user group assigned to a user accessing the user interface. For example, administrators and operators may belong to different user groups and may have different access rights to perform operations such as setting resources online or offline, setting a preferred member, or enumerating resources.

The current states of the takeover groups 204 and 210 and resources may be monitored and the higher level management layer is informed about the current states of the groups and their resources. Based on such monitoring, the higher level management layer may be able to automatically switch preferred members in takeover groups, to change the desired states of takeover groups and resources etc. The monitoring may be performed by receiving monitoring information that is 'pushed' from the end-to-end automation layer. The switching of a first and second preferred member may be triggered by an external source and depends on the monitored states such as one of a desired state, observed state, compound state and operational state of the takeover groups.

Figure 4:
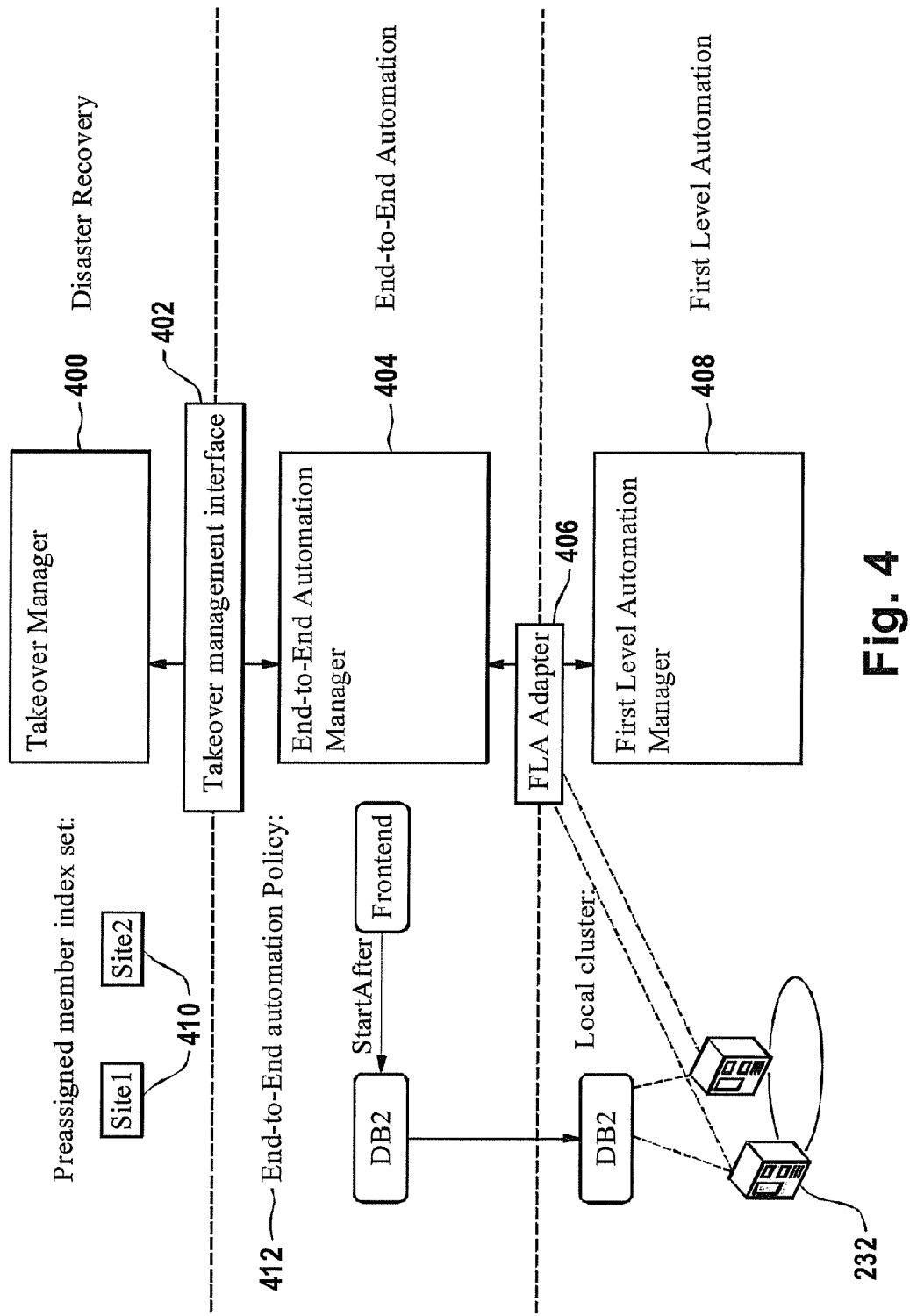
FIG. 4 is a block diagram of an illustrative embodiment of different automation layers from an architectural view.

FIG. 4 is a block diagram of an illustrative embodiment of different automation layers from an architectural view. Within a first level automation layer, each local cluster includes a first level automation manager, which ensures high availability of resources within the scope of the local cluster. Within an end-to-end automation layer, an end-to-end automation manager may be provided with global scope, i.e., with a global overview over all local clusters. The end-to-end automation manager may be responsible for automation of cross-cluster dependencies. The end-to-end automation layer and the system automation software of the first level automation layer clusters communicate via first level automation (FLA) adapters. For simplicity, FIG. 4 shows only a single cluster. However, there may be multiple clusters in the first level automation layer.

A communication between the disaster recovery layer and the end-to-end automation layer may be performed by means of a 'takeover management interface.' The takeover manager 400 within the disaster recovery layer may be responsible for disaster recovery. It controls data mirroring and manages the transfer of workload from one site to another. By means of a pre-assigned member index set (e.g., a set of labels 410), the takeover manager 400 may be able to switch preferred members in takeover groups in the end-to-end automation layer by means of a simple, static interface. Because the label set is static, this interface may be independent of the actual resource names.

Changes within the end-to-end automation layer may be possible without the need to change the end-to-end automation policy 412 and without the need to restart the automation engine. This may enable handling a wide variety of scenarios in which a takeover manager 400 may switch preferred members. For example, such scenarios may include; day/night configurations, weekend configurations, recovery due to an outage of local clusters, maintenance, disaster recovery simulation and disaster recovery process optimization.

Figures 5, 6:
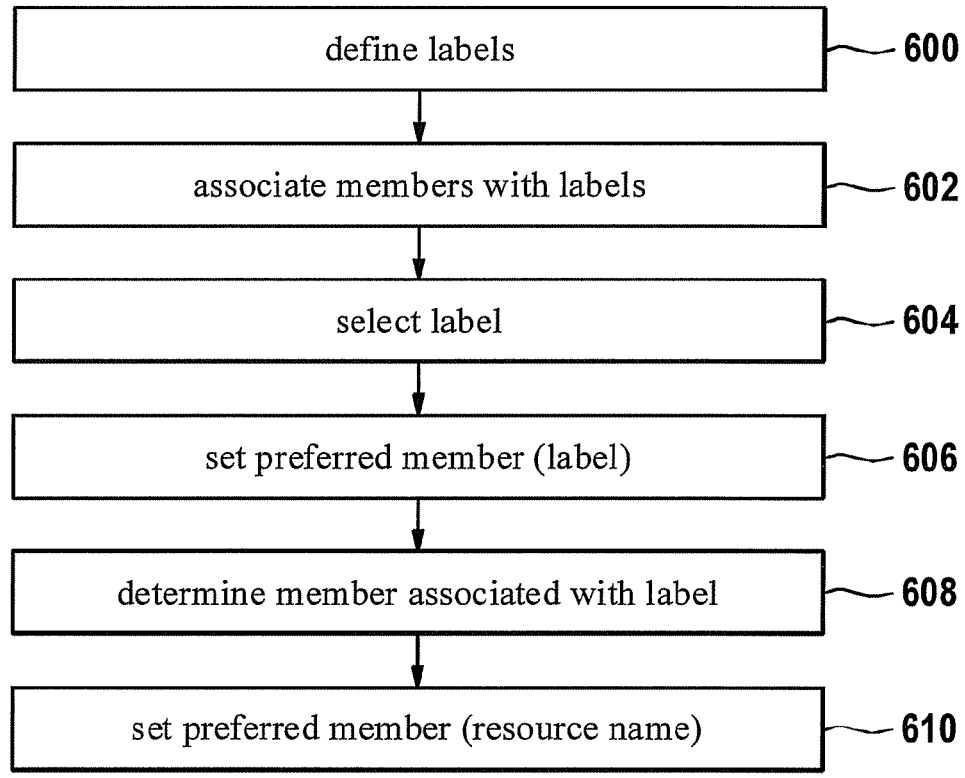
FIG. 5 is a table illustrating role-based access control of operations per resource type.
FIG. 6 is a flowchart of an illustrative embodiment of a method of switching members in takeover groups.

FIG. 5 is a table illustrating role-based access control of operations per resource type. The access rights for each resource type are defined in the table of FIG. 5. The table defines which role can perform which operation. Different roles may be defined. For example, the role of an operator, administrator, disaster recovery manager, automation manager etc., may be defined. For each role, specific rights can be assigned, such as the right to place online requests of offline devices, to set the preferred members in takeover groups, to enumerate resources, and to subscribe for events. Access rights can be generally granted or denied for each role and for each resource type. According to the table depicted in FIG. 5, a switch of takeover groups is only allowed for the disaster recovery layer by means of the automation manager, and an operator is not enabled to perform such an action. Takeover groups may be switchable by the disaster recovery layer whose role may be the only one that has permission to set the preferred member of takeover groups. The desired state of takeover groups can be controlled only by the end-to-end automation manager whose role may be granted to set online- or offline requests for takeover groups.

FIG. 6 is a flowchart of an illustrative embodiment of a method of switching members in takeover groups. At 600, labels semantically denoting members in a takeover group are defined. Advancing to 602, members in a takeover group are associated with the labels. The actions of 600 and 602 can be performed at a time of policy creation. Moving to 604, a label of the defined set of labels may be selected. Continuing at 606, a command is issued for setting the preferred member of the takeover group according to the label selected at 604. At 608, the takeover group member is determined that is associated with the label. This resource is made the new preferred member. Advancing to 610, the functionality to set the preferred member in a choice group according to a resource name is reused by passing the name of the resource determined in the previous step. In this way, the member which is associated with the label may be set as preferred member of the takeover group.

Figure 7:
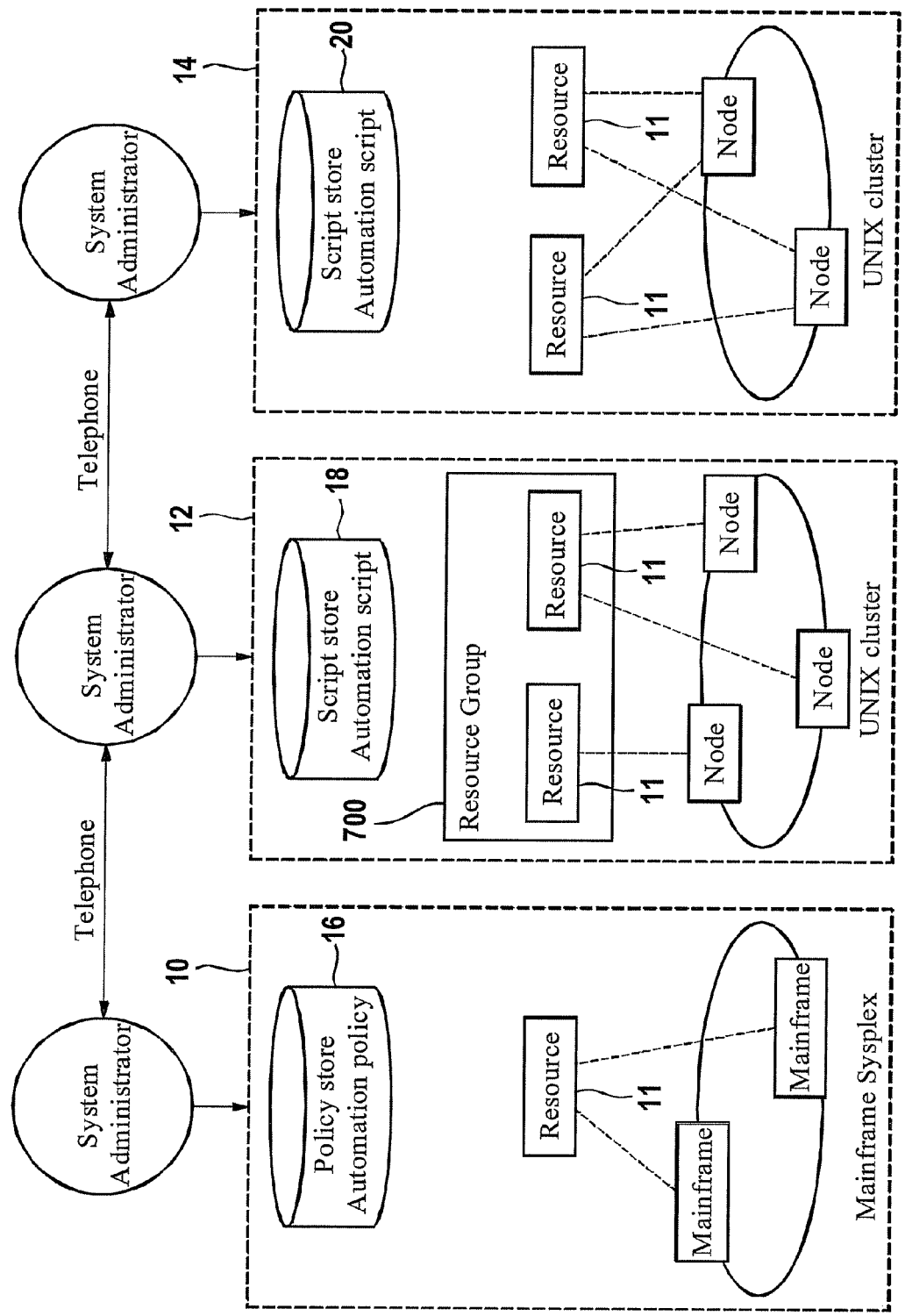
FIG. 7 is a general diagram of an illustrative embodiment of a schematic system view of an environment having resources with possible interdependencies and hosted on possibly multiple clusters on identical or different platforms.

FIG. 7 is an illustrative embodiment of a system view of an environment having resources with interdependencies and hosted on multiple clusters on identical or different platforms. In FIG. 7, a preferred member of a set of members included in a first takeover group is switched. The set of members in the first takeover group describe resource configuration alternatives for associated resources. The resources may reside on one or multiple different clusters. The first takeover group may be defined by a predetermined automation policy. The set of members in the first takeover group include a first preferred member describing a first active resource configuration. The members may be associated with labels of a predetermined set of labels. The labels semantically denote the members. In some embodiments, the computer system includes a component to receive a command that specifies one label of the set of labels and an operation statement. The operation statement indicates switching of a preferred member. A component switches to a new first preferred member of the set of members included in the first takeover group by selecting the member associated with the label specified in the configuration command, wherein the new first preferred member describes a new first active resource configuration.

In accordance with another embodiment, the resources reside in one or multiple different clusters on identical or different system platforms that include redundant applications or configurations.

Another embodiment is a computer program product including computer executable instructions to perform any of the actions of the methods described herein of switching a preferred member of a set of members.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks of the Figures.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope of the disclosure. The embodiment was chosen and described in order to best explain the principles of the disclosure and the practical application, and to enable others of ordinary skill in the art to understand the invention for various embodiments with various modifications as are suited to the particular use contemplated.

What is claimed is:

1. A method comprising:
    creating a plurality of takeover groups, by a processor device, including a first takeover group and a second takeover group from a set of computing resources, wherein:
        a particular function is provided by each computing resource of the first takeover group, wherein one member of the first takeover group is in an on state, the other members of the first takeover group are in an off state, and each member of the first takeover group is at a different site; and
        a relationship between two or more computing resources of the set of computing resources includes one of a start-after relationship, a stop-after relationship, and a forced-down-by relationship;
    assigning a first label associated with a first site to a first computing resource at the first site, wherein the first computing resource is included in the first takeover group, and wherein the first label is assigned to a first resource reference identifying the first computing resource;
    assigning a second label associated with a second site to a second computing resource at the second site, wherein the second computing resource is included in the first takeover group, wherein the second label is assigned to a second resource reference identifying the second computing resource, and wherein the second site is distinct from the first site;
    assigning the first label to a third computing resource at the first site, wherein the third computing resource is included in the second takeover group, wherein the first label is assigned to a third resource reference identifying the third computing resource;
    assigning the second label to a fourth computing resource at the second site, wherein the fourth computing resource is included in the second takeover group, wherein the second label is assigned to a fourth resource reference identifying the fourth computing resource;
    creating a co-indexed relationship between the first takeover group and the second takeover group to enable selection of particular computing resources via a particular label; and
    in response to receiving a command that includes selection of the first label, placing the first computing resource and the third computing resource in an online state and placing the second computing resource and the fourth computing resource in an offline state using a single atomic operation.

2. The method of claim 1, wherein the first computing resource and the third computing resource are placed in the online state and the second computing resource and the fourth computing resource are placed in the offline state simultaneously.

3. The method of claim 1, further comprising, in response to receiving a second command that includes selection of the second label, placing the second computing resource and the fourth computing resource in the online state and placing the first computing resource and the third computing resource in the offline state using a second single atomic operation.

4. The method of claim 3, wherein the second computing resource and the fourth computing resource are placed in the online state substantially simultaneously with placing the first computing resource and the third computing resource in the offline state.

5. The method of claim 1, wherein the command is an automatically generated command.

6. The method of claim 1, wherein creating the plurality of takeover groups comprises:
    retrieving an automation policy; and
    creating the plurality of takeover groups based on the automation policy.

7. The method of claim 1, further comprising:
    assigning a third label associated with a third site to a fifth computing resource at the third site, wherein the third label is assigned to a fifth resource reference identifying the fifth computing resource, wherein the third site is distinct from the first site and the second site; and
    assigning the third label to a sixth computing resource at the third site, wherein the third label is assigned to a sixth resource reference identifying the sixth computing resource.

8. The method of claim 7, further comprising, in response to receiving a second command that includes selection of the third label, placing the fifth computing resource and the sixth computing resource in the online state and placing the first computing resource, the second computing resource, the third computing resource, and the fourth computing resource in the offline state using a second single atomic operation.

9. A system, comprising:
    a processor; and
    a non-transitory memory to store instructions that, when executed by the processor, cause the processor to:
        receive a first online request for a resource group, wherein the resource group includes a resource and a takeover group;
        in response to receiving the first online request:
            send a second online request to the resource; and
            send a third online request to the takeover group, wherein:
                the takeover group includes a plurality of computing resources configured to provide a common function;

one computing resource of the takeover group is in an on state and provides the common function while the remaining computing resources of the takeover group are in an off state and available as alternative computing resources to the computing resource in the on state;

each computing resource of the plurality of computing resources is assigned one or more labels from a set of labels;

a first computing resource of the plurality of computing resources is a preferred member of the takeover group, the preferred member having a first label; and in response to the third online request, the takeover group switches the preferred member to the on state;

receive a command including a selection of a second label; and send the command to the takeover group to select a second computing resource having the second label as a new preferred member and to use a single atomic operation to switch the second computing resource to the on state and to switch the first computing resource preferred member to the off state.

10. The system of claim 9, wherein the takeover group comprises a first database and a second database that includes a copy of data in the first database.

11. The system of claim 9, further comprising instructions that, when executed by the processor, cause the processor to create the takeover group based on an automation policy.

12. A computer readable storage device comprising instructions that, when executed by a processor, cause the processor to:

create a plurality of takeover groups including a first takeover group and a second takeover group from a set of computing resources, wherein a particular function is provided by each computing resource of a particular takeover group, and wherein a relationship between two or more computing resources of the set of computing resources includes one of a start-after relationship, a stop-after relationship, and a forced-down-by relationship;

assign a first label associated with a first site to a first computing resource at the first site, including assigning the first label to a first resource reference identifying the first computing resource;

assign a second label associated with a second site to a second computing resource at the second site, including assigning the second label to a second resource reference identifying the second computing resource, wherein the second site is distinct from the first site;

assign the first label to a third computing resource at the first site, including assigning the first label to a third resource reference identifying the third computing resource;

assign the second label to a fourth computing resource at the second site, including assigning the second label to a fourth resource reference identifying the fourth computing resource;

create a co-indexed relationship between the first takeover group and the second takeover group to enable selection of particular computing resources via a particular label; and in response to receiving a command that includes selection of the first label, place the first computing resource and the third computing resource in an online state and place the second computing resource and the fourth computing resource in an offline state using a single atomic operation.

13. The computer readable storage device of claim 12, further comprising instructions that, when executed by the processor, cause the processor to place the second computing resource and the fourth computing resource in the online state and to place the first computing resource and the third computing resource in the offline state using a second atomic operation in response to receiving a second command that includes selection of the second label.

14. The computer readable storage device of claim 12, wherein the first computing resource is a first database, wherein the second computing resource is a second database, and further comprising instructions that, when executed by the processor, cause the processor to mirror data stored at the first database at the second database.

15. The computer readable storage device of claim 12, further comprising instructions that, when executed by the processor, cause the processor to create the first takeover group based on an automation policy.

16. The computer readable storage device of claim 15, further comprising instructions that, when executed by the processor, cause the processor to create the second takeover group based on the automation policy.

17. The computer readable storage device of claim 14, further comprising instructions that, when executed by the processor, cause the processor to place the second computing resource and the fourth computing resource in the online state and to place the first computing resource and the third computing resource in the offline state, using a second atomic operation, in response to receiving a second command that includes selection of the second label.

18. The computer readable storage device of claim 17, further comprising instructions that, when executed by the processor, cause the processor to stop mirroring the data stored at the first database at the second database.

19. The system of claim 9, wherein each label of the set of labels is assigned to one or fewer computing resources of the plurality of computing resources of the takeover group.

20. The system of claim 9, wherein the command is received from a disaster recovery manager.

* * * * *